United States Patent [19]

Lopez

[11] Patent Number: 5,730,267
[45] Date of Patent: Mar. 24, 1998

[54] CLUTCH MECHANISM, ESPECIALLY FOR A MOTOR VEHICLE

[75] Inventor: Carlos Lopez, Madrid, Spain

[73] Assignee: Valeo, Paris, France

[21] Appl. No.: 604,957

[22] PCT Filed: Jun. 28, 1995

[86] PCT No.: PCT/FR95/00862

§ 371 Date: Feb. 28, 1996

§ 102(e) Date: Feb. 28, 1996

[87] PCT Pub. No.: WO96/00857

PCT Pub. Date: Jan. 11, 1996

[30] Foreign Application Priority Data

Jun. 28, 1994 [FR] France .................. 94 07954

[51] Int. Cl.$^6$ .................................. F16D 13/44
[52] U.S. Cl. .................... 192/70.27; 192/89.23; 192/89.25
[58] Field of Search ............... 192/70.27, 70.29, 192/89.22, 89.23, 89.25

[56] References Cited

U.S. PATENT DOCUMENTS

| | | | |
|---|---|---|---|
| 4,737,492 | 4/1988 | Ball et al. | 192/70.27 X |
| 4,828,092 | 5/1989 | Kohler | 192/70.27 X |
| 4,940,126 | 7/1990 | Flotow et al. | 192/70.27 X |
| 5,181,594 | 1/1993 | Nash | 192/70.27 |

FOREIGN PATENT DOCUMENTS

| | | |
|---|---|---|
| 1317772 | 5/1963 | France . |
| 2189658 | 1/1974 | France . |
| 2577293 | 8/1986 | France . |
| 2580752 | 10/1986 | France . |
| 2606108 | 5/1988 | France . |
| 35 16 152 | 6/1986 | Germany . |
| 43 26 501 | 2/1994 | Germany . |

*Primary Examiner*—Andrea L. Pitts
*Attorney, Agent, or Firm*—Longacre & White

[57] ABSTRACT

A clutch mechanism having a cover plate (11), a pressure plate (13), and two diaphragms (14A, 14B) disposed therebetween. Each diaphragm (14A, 14B) has firstly, a peripheral portion (15A, 15B) defining a Belleville ring which engages the cover plate (11) and bears on the pressure plate (13), and secondly a central portion (17A, 17B) which is divided into radial fingers (18A, 18B) by slots. The peripheral portions (15A, 15B) of the two diaphragms (14A, 14B) are essentially spaced axially apart, and have different geometrical characteristics such that the characteristic curve of the assembly has no hump.

14 Claims, 2 Drawing Sheets

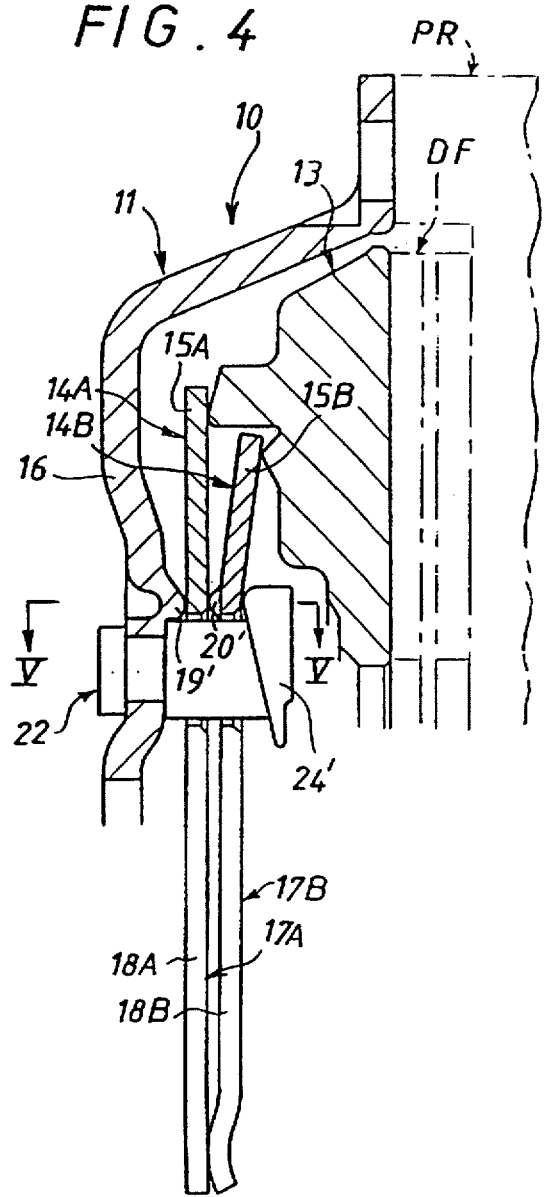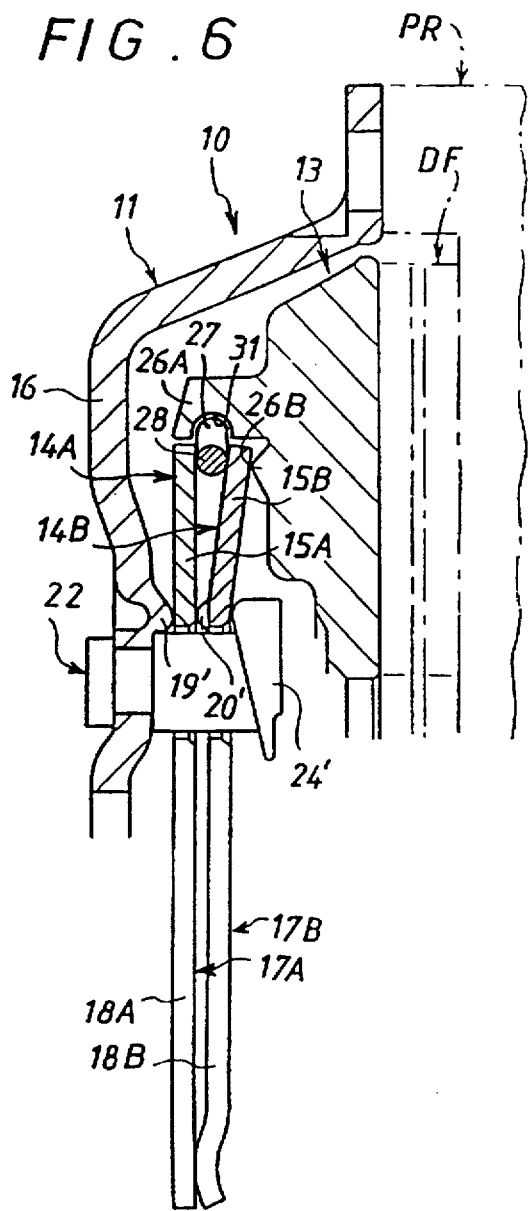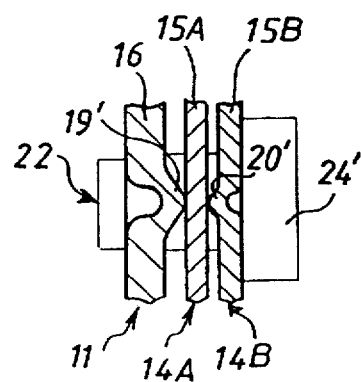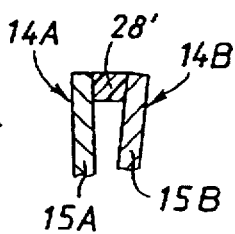

CLUTCH MECHANISM, ESPECIALLY FOR A MOTOR VEHICLE

BACKGROUND OF THE INVENTION

1. Field of the Invention

This invention relates, in general terms, to clutch mechanisms of the kind comprising, in the form of generally annular components, a cover plate, a pressure plate, and at least one diaphragm interposed operatively between these latter.

This diaphragm has, firstly, a peripheral portion defining a Belleville ring, which engages on the cover plate in the vicinity of one of its peripheries and bears on the pressure plate in the vicinity of its other periphery, and secondly, a central portion divided into radial fingers by slots.

In use, when the clutch mechanism is attached on a reaction plate through its cover plate, with a friction disc between the pressure plate and the reaction plate, the diaphragm biasses the pressure plate towards the reaction plate, so that, the friction disc being duly gripped between these latter by its friction liners, the clutch thus constituted is engaged.

In order to disengage this clutch, it is necessary to exert a certain axial force on the ends of the radial fingers of the diaphragm.

The application of this force is obtained by means of a clutch release bearing, which is mounted for axial movement under the control of the clutch pedal or of an actuator.

However, the characteristic curve for the operating mode of the diaphragm, that is to say the curve which expresses the axial force that must be exerted on the ends of its radial fingers in order to give a predetermined axial travel at this level, starts as a rising curve and then usually passes through a maximum before subsequently becoming a falling, and possibly once again a rising, curve, thus defining a "hump" which depends in practice on the geometrical characteristics of the diaphragm, and in particular on the ratio between, firstly, the height of the frustum of a cone which is defined by its peripheral portion, and secondly its thickness.

As a result, the load at the clutch release bearing decreases beyond a certain travel, before possibly once again increasing, and the same effect occurs at the clutch pedal which is detrimentally felt by the user, and which can indeed be uncomfortable.

2. Description of the Prior Art

It has previously been proposed, in addition, to make use of two diaphragms instead of one for various reasons.

In the document FR-A-1 317 772, for example, two identical diaphragms are disposed in tandem, so as to increase the value of the torque that can be transmitted.

In the document FR-A-2 580 752, the diaphragm is only doubled up by another over a portion of its extent which essentially corresponds to its radial fingers, this being for the purpose of stiffening the latter.

However, in both cases the "hump" problem remains the same.

In the document FR-A-2 189 658, which is not concerned with a clutch mechanism, it has further been proposed, in order to render the said hump uniform, to arrange in tandem two Belleville rings having geometrical characteristics which are equal in absolute values, but which are of opposite senses.

Apart from the high friction that develops in service between these two Belleville rings, the characteristic curve of the assembly still has a hump.

SUMMARY OF THE INVENTION

An object of the invention is to provide a clutch mechanism in which this hump is minimised to advantage, or even eliminated, without at the same time any significant friction being developed.

This clutch mechanism, which is of the kind concerned, and which has two diaphragms, is in general terms characterised in that, in combination, the peripheral portions of the two diaphragms are essentially spaced apart axially from each other, and in that they have different geometrical characteristics in absolute values, and in that along one of their peripheries the peripheral portions of the diaphragms are spaced apart from each other by spacing means.

In practice, these peripheral portions are so selected that the force/travel characteristic curve of the assembly has a substantially flat local portion, instead of having any hump whatsoever.

Thus, after the rising part of the curve, the load at the clutch release bearing stays substantially constant, and the same is true at the clutch pedal.

The features and advantages of the invention will appear more clearly from the following description, by way of example, with reference to the attached diagrammatic drawings, in which:

BRIEF DESCRIPTION OF THE DRAWINGS

FIG. 4 is a half view in axial cross section, similar to that in FIG. 1 but showing a modified embodiment;

FIG. 5 is a partial view of this modified embodiment, in circumferential cross section taken on the line V—V in FIG. 4;

FIG. 6 is again a half view in axial cross section similar to FIG. 1, but showing another modified embodiment;

FIG. 7 is a view which partly repeats that of FIG. 6, but shows a further modification.

DETAILED DESCRIPTION OF THE PREFERRED EMBODIMENT

Figure 1:
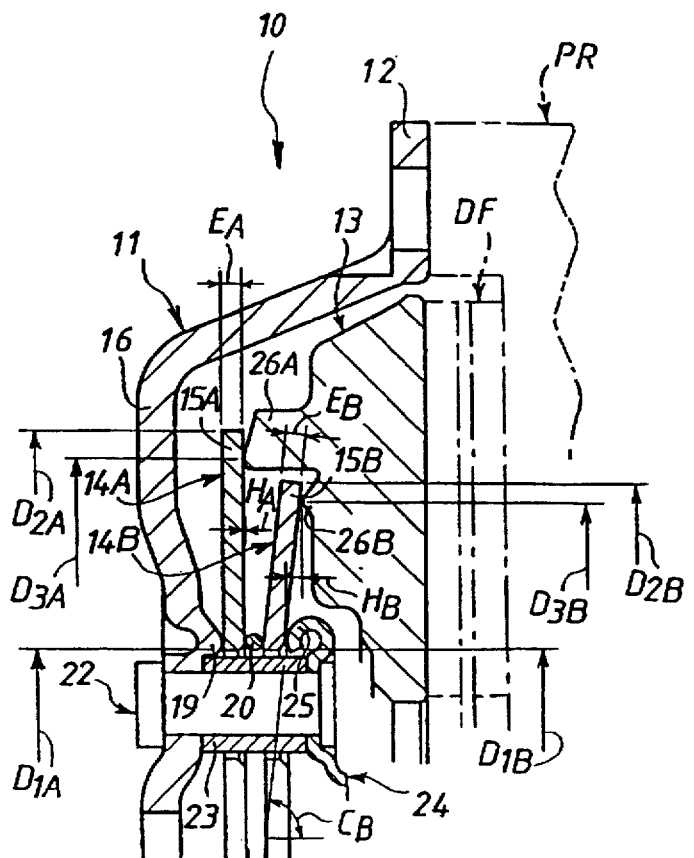
FIG. 1 is a half view, in axial cross section, of a clutch mechanism in accordance with the invention.

As is shown in the drawings, the clutch mechanism 10 in accordance with the invention includes, generally, in the form of generally annular components having a common axis A, a cover plate 11 having a transverse flange 12 by which it is adapted to be attached on a reaction plate, part of which is indicated diagrammatically in phantom lines in FIGS. 1, 4 and 6 under the general reference PR, a pressure plate 13 which is mounted for axial movement with respect to the cover plate 11 while being coupled with the latter, conventionally by means of resiliently deformable tongues for rotation with it, and, interposed between the cover plate 11 and the pressure plate 13, two diaphragms 14A, 14B which, in use, permanently bias the pressure plate 13 towards the reaction plate PR so as to grip a friction disc which is indicated diagrammatically in phantom lines in FIGS. 1, 4 and 6 under the general reference DF.

Each of the diaphragms 14A, 14B, which are generally frusto-conical in form in the free state, has, firstly, a peripheral portion 15A, 15B constituting a Belleville ring, which engages on the cover plate 11 and, more precisely, on the base portion 16 of the latter in the vicinity of one of its peripheries, and which bears on the pressure plate 13 in the vicinity of its other periphery, and secondly, a central portion 17A, 17B which is divided into radial fingers 18A, 18B by means of slots.

In this example the peripheral portion 15A, 15B of the diaphragms 14A, 14B engages on the base portion 16 of the cover plate 11 in the vicinity of its inner periphery, that is to say its periphery having the smaller diameter, and it bears on the pressure plate 13 in the vicinity of its outer periphery, that is to say its periphery having the greater diameter.

The clutch mechanism 10 in this example is thus of the push-to-release type.

Let $E_A$, $E_B$ be the thickness of the diaphragms 14A, 14B, and let $H_A$, $H_B$ be the height of the frustum of a cone defined in the free state by their peripheral portions 15A, 15B (in the drawings, if the clutch comprising the clutch mechanism 10, the reaction plate PR and the friction disc DF is considered to be engaged, and to be in a new state, with friction liners of the friction disc DF unworn, this cone frustum height $H_A$ is virtually zero for the diaphragm 14A).

Let $C_A$, $C_B$ be the conicity in the free state of the peripheral portions 15A, 15B of the diaphragms 14A, 14B, that is to say the half-angle at the apex of the frustum of a cone which it defines in the free state (in the drawings, and for the same reasons as above, the conicity $C_A$ is virtually equal to 90°).

Finally, let $D1_A$, $D1_B$ be the diameter of the inner periphery of the peripheral portion 15A, 15B of the diaphragms 14A, 14B, and let $D2_A$, $D2_B$ be the diameter of their outer periphery.

In accordance with the invention, and in combination, firstly, the peripheral portions 15A, 15B of the two diaphragms 14A, 14B are essentially spaced axially away from each other, and secondly, they have different geometrical characteristics in absolute values, and in that [sic] the peripheral portions 15A, 15B of the diaphragms 14A, 14B are spaced apart along one of their peripheries by spacing means 20, 28'-28'-20'.

In this example, the peripheral portions 15A, 15B have conicities $C_A$, $C_B$ in the free state which are different but of the same sign, and their inner peripheries have substantially parallel diameters $D1_A$, $D1_B$.

In the present case the conicities $C_A$, $C_B$ of the peripheral portions 15A, 15B of the diaphragms 14A, 14B are also different when, as shown, the clutch concerned is engaged.

For the diaphragm 14A which is the one closer to the cover plate 11, the peripheral portion 15A is engaged directly on the base portion 16 of the cover plate 11, on an annular bead 19 press-formed for this purpose in the latter.

In FIG. 1 the peripheral portions 15A, 15B of the diaphragms 14A, 14B are spaced axially away from each other by a ring 20 along their inner peripheries.

It is thus through this interposed ring 20 that, for the diaphragm 14B, the peripheral portion 15B is engaged on the base portion 16 of the cover plate 11.

In order to provide an axial abutment for the diaphragms 14A, 14B on the opposite side from the base portion 16 of the cover plate 11, there are arranged, from place to place on a circle, stub members 22 which extend through the diaphragms 14A, 14B from one side to the other, via the enlarged slot portions which are normally present at the root of the slots that define their radial fingers 18A, 18B, and the stub members are attached by riveting on the base portion 16 of the cover plate 11, so as to clamp, firstly, and each one individually, a spacer sleeve 23, which is preferably hardened, and secondly, collectively, a crown ring 24 which has a bead 25 aligned with the bead 19 and ring 20.

In FIG. 1, the peripheral portions 15A, 15B of the diaphragms 14A, 14B bear on the pressure plate 13 along circumferences of the latter having different diameters $D3_A$, $D3_B$.

In this example the peripheral portion 15B of the diaphragm 14A has, at its outer periphery, a diameter $D2_A$ greater than the diameter $D2_B$ of the outer periphery of the peripheral portion 15B of the diaphragm 14B itself.

The peripheral portion 15A of the diaphragm 14A then bears on the pressure plate 13 along a circumference of diameter $D3_A$ greater than the diameter $D3_B$ of the circumference along which the peripheral portion 15B of the diaphragm 14B itself bears on the pressure plate 13.

For the diaphragm 14A, the plate 13 carries, spaced apart on a circle, axially projecting noses 26A, and similarly, for the diaphragm 14B, it carries, spaced apart on a circle, noses 26B which also project axially.

The noses 26B are arranged on a pitch circle having a diameter smaller than that of the pitch circle on which the noses 26A are located.

Apart from their conicity $C_A$, $C_B$ in the free state, and the diameter $D2_A$, $D2_B$ of their outer periphery, other geometrical features of the peripheral portions 15A, 15B of the diaphragms 14A, 14B may differ from one to the other.

This can for example be the case for their ratios of cone frustum height $H_A$, $H_B$ to thickness $E_A$, $E_B$.

Figure 2:
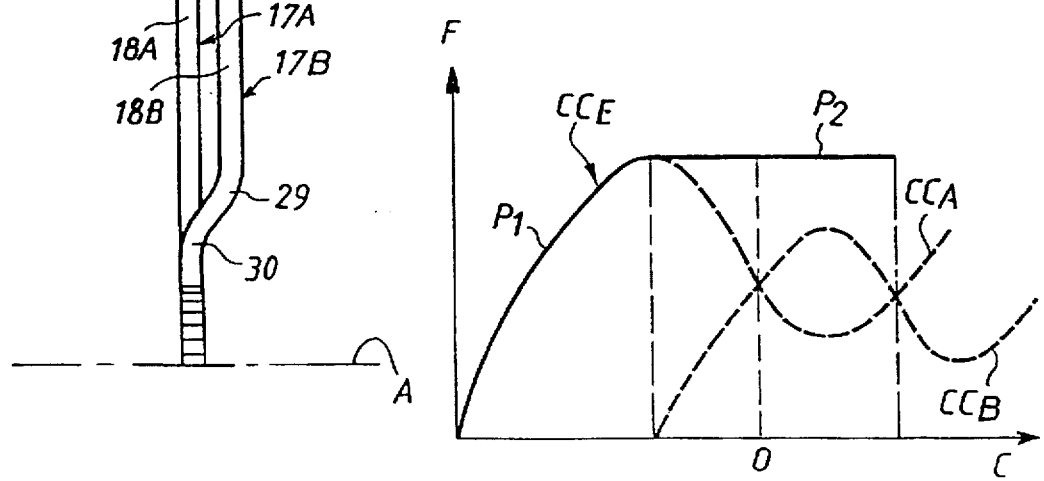
FIG. 2 is a diagram showing the operation of this clutch mechanism.

In all cases, and in accordance with the invention, the peripheral portions 15A, 15B of the diaphragms 14A, 14B are generally so chosen that, as is apparent from the diagram of FIG. 2, the characteristic curve $CC_E$, representing force F plotted against travel C of the assembly, shows a substantially flat local portion $P_2$ following a rising portion $P_1$.

The diagram of FIG. 2 also shows, in broken lines, the characteristic curve $CC_A$ of the diaphragm 14A taken in isolation, together with the characteristic curve $CC_B$ of the diaphragm 14B.

Each of these two curves has a characteristic hump, but this is not the case with the characteristic curve $CC_E$ of the assembly.

Figure 3:
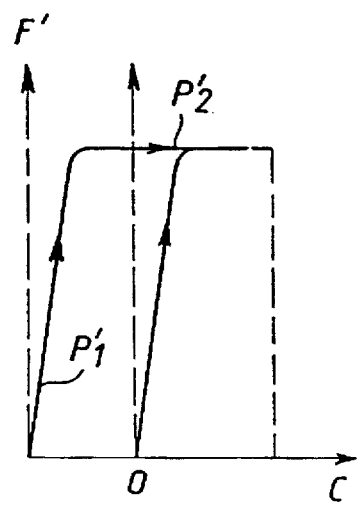
FIG. 3 is a diagram giving the load at the corresponding clutch release bearing.

Similarly, and as is evident from the diagram of FIG. 3, the load F' on the clutch release bearing has, in accordance with the invention, a substantially flat portion $P'_2$ following a rising phase $P'_1$.

Preferably, and as is shown in these diagrams, the arrangement is lo such that, in the beginning, i.e. when the friction disc DF is new, the point O, representing the inoperative state in which travel C is zero, is substantially in the middle of the portion $P_2$, $P'_2$, so as to reserve the preceding part of these portions $P_2$, $P'_2$ for wear in the friction liners of the friction disc DF; the characteristic curves $CC_A$, $CC_B$ of the diaphragms 14A, 14B are offset from each other.

In FIG. 4 the peripheral portions 15A, 15B of the diaphragms 14A, 14B are spaced apart axially from each other along their inner peripheries, by projections 20' which are fixed with respect to each other, being for example made integrally with the diaphragms as shown, and which are located from place to place along a pitch circle in place of the ring 20 described above.

In this example the projections 20' are press formed in the peripheral portion 15B of that diaphragm, 14B, which is the closer to the pressure plate 13.

Also in FIG. 4, the crown ring 24 is omitted, with the stub members 22 including at this location a head 24' which is so configured as to provide, at 25', the necessary engagement for the diaphragms 14A, 14B.

Finally in FIG. 4, the bead 19 which is formed in the base portion 16 of the cover plate 11 is replaced by projecting elements 19' located from place to place along a pitch circle.

In FIG. 6, the peripheral portions 15A, 15B of the diaphragms 14A, 14B bear on the pressure plate 13 along a common circumference of the latter, by means, in this example, of the noses 26B previously provided only for the diaphragm 14B.

In this example the peripheral portions 15A, 15B are then spaced axially away from each other by a ring 28 along their outer peripheries.

The diameter of the transverse cross section of the ring 28 is, in this example, greater than that of the transverse cross section of the above mentioned ring 20.

For example, and as shown, the ring 28 has half-wave deformations 27 formed from place to place along a pitch circle and projecting radially outwards, and is in engagement through these deformations with a groove 31 which is provided for this purpose in the projecting noses 26A, which are retained to this end in the pressure plate 13.

In FIG. 7, the ring 28 is replaced by a rubber ring 28', to which the peripheral portions 15A, 15B of the diaphragms 14A, 14B are adhesively bonded.

In FIG. 1, the radial fingers 18A, 18B of the diaphragms 14A, 14B are, in addition, interleaved circumferentially with each other, the radial fingers 18B of the diaphragm 14B having for this purpose, in the vicinity of their free ends, two zones of inflexion 29, 30 of opposite senses, whereby the free ends of these fingers are brought into the same plane as the radial fingers 18A of the diaphragm 14A.

In FIGS. 4 and 6, the radial fingers 18B of the diaphragm 14A are modified so as to bear on the radial fingers 18A of the diaphragm 14A at their free ends, these free ends being rounded appropriately for this purpose.

The invention is of course not limited to the embodiments described and shown, but embraces any practical version and/or any combination of their various elements.

I claim:

1. A clutch mechanism comprising: in the form of generally annular components, a cover plate (11), a pressure plate (13), and, interposed operatively between these latter, two diaphragms (14A, 14B), each of the diaphragms (14A, 14B) comprising, firstly, a peripheral portion (15A, 15B) constituting a Bellevile ring which engages the cover plate (11) adjacent one of its peripheries and which bears on the pressure plate (13) adjacent its other periphery, and secondly, a central portion (17A, 17B) which is divided into radial fingers (18A, 18B) by slots, wherein, in combination, the peripheral portions (15A, 15B) of the two diaphragms (14A, 14B) are essentially spaced apart axially from each other, and they have different geometric characteristics, and along one of their peripheries the peripheral portions (15A, 15B) of the diaphragms (14A, 14B) are spaced apart from each other by spacing means (20, 28-28'-20').

2. A clutch mechanism according to claim 1, wherein the peripheral portions (15A, 15B) of the diaphragms (14A, 14B) have different ratios of cone frustum height ($H_A$, $H_B$) to thickness ($E_A$, $E_B$).

3. A clutch mechanism according to claim 1, wherein the peripheral portions (15A, 15B) of the diaphragms (14A, 14B) have different conicities ($C_A$, $C_B$) in the free state.

4. A clutch mechanism according to claim 3, wherein the peripheral portions (15A, 15B) of the diaphragms have different conicities ($C_A$, $C_B$) when the associated clutch is engaged.

5. A clutch mechanism according to claim 1, wherein the peripheral portions (15A, 15B) of the diaphragms (14A, 14B) have different diameters ($D2_A$, $D2_B$) at their outer periphery.

6. A clutch mechanism according to claim 1, wherein the peripheral portions (15A, 15B) of the diaphragms (14A, 14B) are so chosen that the characteristic curve ($CC_E$) of force (F) to travel (C) of the assembly has a substantially flat local portion ($P_2$).

7. A clutch mechanism according to claim 1, wherein the peripheral portions (15A, 15B) of the diaphragms (14A, 14B) bear on the cover plate (11) along a common circumference of the latter.

8. A clutch mechanism according to claim 1, wherein the peripheral portions (15A, 15B) of the diaphragms (14A, 14B) bear on the pressure plate (13) along a common circumference of the latter.

9. A clutch mechanism according to claim 1, wherein the peripheral portions (15A, 15B) of the diaphragm (14A, 14B) bear on the pressure plate (13) along circumferences of the latter having different diameters ($D3_A$, $D3_B$).

10. A clutch mechanism according to claim 1, wherein along one of their peripheries, the peripheral portions (15A, 15B) of the diaphragms (14A, 14B) are spaced apart axially from each other by a ring (20, 28).

11. A clutch mechanism according to claim 1, wherein along one of their peripheries, the peripheral portions (15A, 15B) of the diaphragms (14A, 14B) are spaced apart axially from each other by a rubber ring (28') to which they are adhesively bonded.

12. A clutch mechanism according to claim 1, wherein along one of their peripheries, the peripheral portions (15A, 15B) of the diaphragms (14A, 14B) are spaced apart axially from each other by projecting elements (20') fixed with respect to each other and made integral with the latter.

13. A clutch mechanism according to claim 1, wherein the radial fingers (18A, 18B) of the diaphragms (14A, 14B) are interleaved circumferentially with each other at their free ends.

14. A clutch mechanism according to claim 1, wherein the radial fingers (18B) of the diaphragm (14B) bear axially on the radial fingers (18A) of the diaphragm (14A) at their free ends.

* * * * *